US012686148B2

(12) United States Patent
Wang et al.

(10) Patent No.: US 12,686,148 B2
(45) Date of Patent: Jul. 21, 2026

(54) METHOD OF FORMING PATTERNS IN LAYERED MATERIALS AT AN ATOMIC SCALE

(71) Applicant: University of South Florida, Tampa, FL (US)

(72) Inventors: Michael Cai Wang, Tampa, FL (US); YunJo Jeong, Tampa, FL (US)

(73) Assignee: University of South Florida, Tampa, FL (US)

( * ) Notice: Subject to any disclaimer, the term of this patent is extended or adjusted under 35 U.S.C. 154(b) by 637 days.

(21) Appl. No.: 17/170,103

(22) Filed: Feb. 8, 2021

(65) Prior Publication Data

US 2021/0245395 A1    Aug. 12, 2021

Related U.S. Application Data

(60) Provisional application No. 62/971,144, filed on Feb. 6, 2020, provisional application No. 63/064,726, filed on Aug. 12, 2020.

(51) Int. Cl.
| | |
|---|---|
| *C01B 32/19* | (2017.01) |
| *B28B 11/08* | (2006.01) |
| *B28B 11/10* | (2006.01) |
| *C04B 35/14* | (2006.01) |
| *C04B 41/45* | (2006.01) |
| *C04B 41/50* | (2006.01) |

(52) U.S. Cl.
CPC .......... *B28B 11/0863* (2013.01); *B28B 11/10* (2013.01); *C01B 32/19* (2017.08); *C04B 35/14* (2013.01); *C04B 41/4505* (2013.01); *C04B*

*41/4572* (2013.01); *C04B 41/5001* (2013.01); *C04B 2235/945* (2013.01)

(58) Field of Classification Search
CPC ..... B28B 11/0863; B28B 11/10; C01B 32/19; C01B 32/194; C04B 35/14; C04B 41/4505; C04B 41/4572; C04B 41/5001; C04B 2235/945
See application file for complete search history.

(56) References Cited

U.S. PATENT DOCUMENTS

| | | | | |
|---|---|---|---|---|
| 5,515,985 A | * | 5/1996 | Ohshita ..................... | C23F 4/00 |
| | | | | 438/711 |
| 5,968,847 A | * | 10/1999 | Ye ........................ | H01L 21/7684 |
| | | | | 257/E21.582 |

(Continued)

FOREIGN PATENT DOCUMENTS

WO    WO-2020103605 A1 *    5/2020    ........... C01B 32/194

OTHER PUBLICATIONS

Muniz, A.R., et al., "Superlattices of Fluorinated Interlayer-Bonded Domains in Twisted Bilayer Graphene", 2013, J. Phys. Chem. C., 117, p. 7315-7325 (Year: 2013).*

(Continued)

*Primary Examiner* — Gordon Baldwin
*Assistant Examiner* — Christina D Mcclure
(74) *Attorney, Agent, or Firm* — Andrew Behrens; Trenam Law

(57)    ABSTRACT

A method of forming a layered material including arranging a 2DLM on a base material comprising one or more Moiré interferences, and adding material or removing material at a location of the one or more Moiré interferences.

10 Claims, 13 Drawing Sheets

500

514

530

(56)            References Cited

U.S. PATENT DOCUMENTS

| | | | | |
|---|---|---|---|---|
| 6,878,635 | B1 * | 4/2005 | Nakatani | H01L 21/0332 257/E21.582 |
| 7,416,989 | B1 * | 8/2008 | Liu | H01L 21/02063 438/706 |
| 2011/0139748 | A1 * | 6/2011 | Donnelly | H01J 37/32045 216/37 |
| 2014/0206192 | A1 * | 7/2014 | Yeom | H01L 21/042 438/720 |
| 2015/0273401 | A1 * | 10/2015 | Miller | B01D 71/022 210/500.39 |
| 2017/0200587 | A1 * | 7/2017 | Godet | H01L 21/3065 |
| 2018/0182597 | A1 * | 6/2018 | Blomberg | C23F 1/12 |
| 2021/0395092 | A1 * | 12/2021 | Peng | C30B 25/10 |

OTHER PUBLICATIONS

Balog, R., et al., "Bandgap Opening in Graphene Induced by Patterned Hydrogen Adsorption", 2010, Nature Materials, 9, p. 315-319, p. 1-7 (Year: 2010).*
Zhao, L., "Influence of copper crystal surface on the CVD growth of large area monolayer graphene", 2011, Solid State Communications, 151, p. 509-513 (Year: 2011).*

* cited by examiner

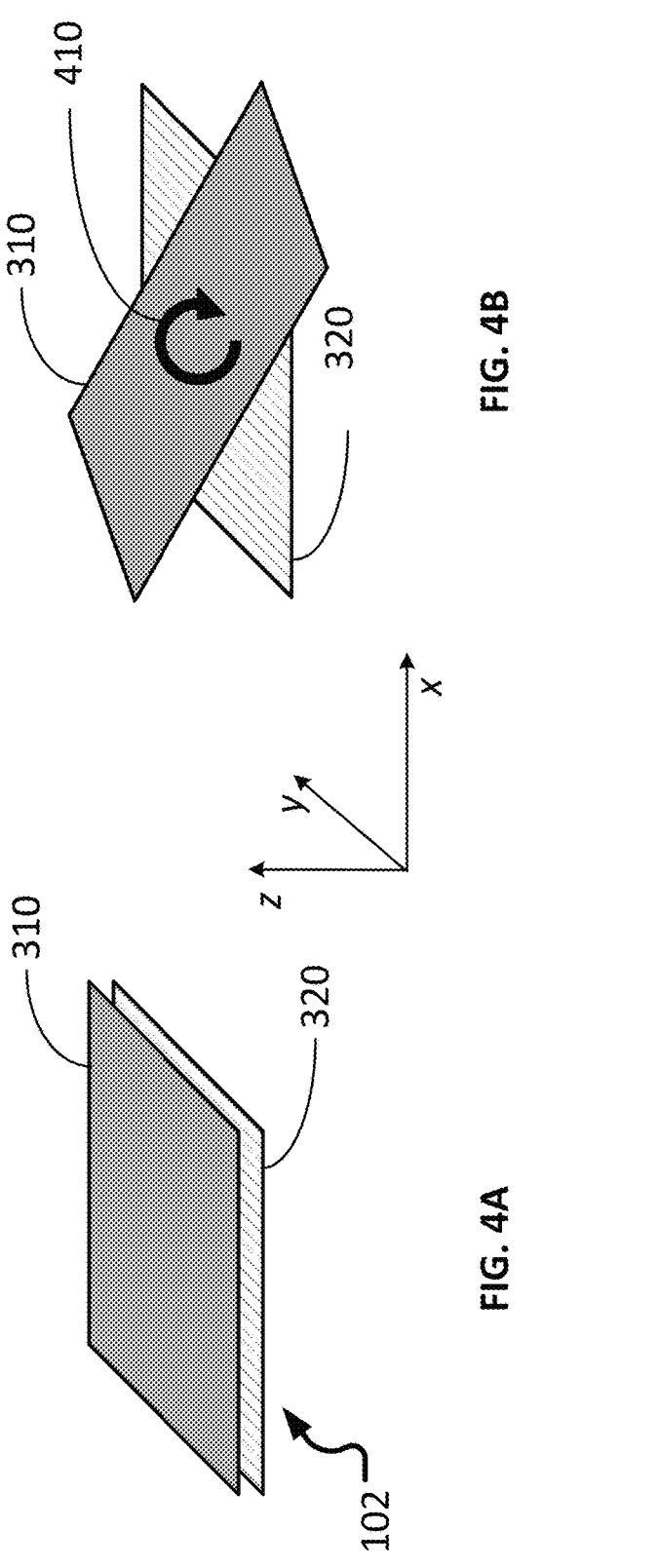
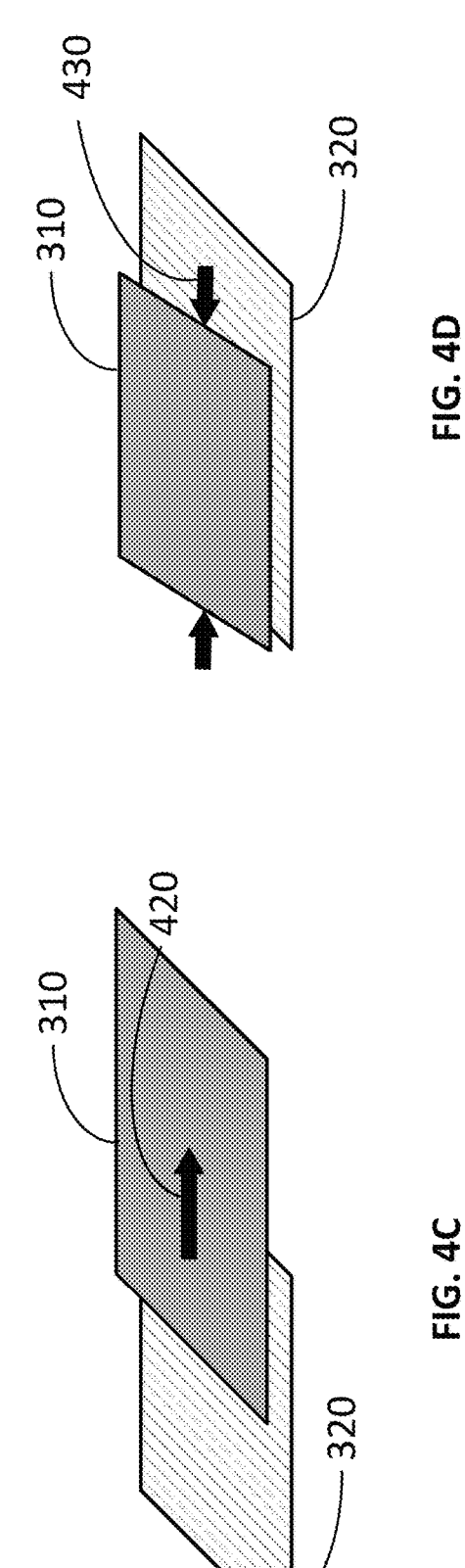

$$\lambda = \frac{(1+\delta)\alpha}{\sqrt{2(1+\delta)[1-\cos(\theta)]+\delta^2}}$$

METHOD OF FORMING PATTERNS IN LAYERED MATERIALS AT AN ATOMIC SCALE

PRIORITY CLAIM

This application claims benefit from U.S. Provisional Patent Application No. 63/064,726, filed Aug. 12, 2020, which claims benefit from U.S. Provisional Patent Application No. 62/971,144, filed Feb. 6, 2020, all of which are hereby incorporated by reference.

STATEMENT AS TO FEDERALLY SPONSORED RESEARCH

This invention was made with government support under 1944638 awarded by the National Science Foundation. The Government has certain rights in the invention.

TECHNICAL FIELD

This document relates to techniques for forming patterns in layered structures using atomic-scale manufacturing methods.

BACKGROUND

The scale of manufacturing has grown smaller according to Moore's law for decades. Traditional subtractive molecular manufacturing methods like lithographically-defined reactive ion etching and focused ion beam etching have driven the field to smaller and smaller scales of manufacture, e.g., those within nanometer-scale resolution. The feature size of modern semiconductor technologies is approximately 5 nm with scales of sub-3 nm to be sought in the near future. While these methods are capable of reaching nanometer-scale precision with very tight tolerances, lithographic methods are reaching their limits and are unable to create ångström-scale features with controllable resolution. Further, modern CMOS manufacturing technologies lack the resolution and scalability to create ordered structures in atomically-thin, two dimensional materials.

Additive and subtractive molecular manufacturing has allowed manufacturers to keep scaling production according to Moore's law but current technologies like chemical vapor deposition have limitations in order and precision. Synthesis and manufacturing of two-dimensional layered materials is now commonplace with hundreds of manufactured examples and thousands predicted in silico, but methods to pattern them with sub-nanoscale precision are still lacking.

SUMMARY

This document describes techniques for manufacturing patterns in layered structures (e.g., nanostructures) by applying angstrom-scale nanomanufacturing methods. Two-dimensional layered materials (2DLMs) are a means to begin the process of additive and subtractive manufacturing at an atomic scale. 2DLMs can be synthesized and arranged into heterostructures with near-limitless permutations. These sheets can then be layered in a controlled manner to form periodic, heterogeneous perturbations on their surfaces. These perturbations are Moiré interference patterns extent from the interface(s) between the two or more layers. These interfacial materials can further exhibit extent properties, such as superconductivity or superlubricity, based upon their superlattice parameters. For example, layered sheets of graphene at a turbostratic angle of 1.10 exhibit superconducting properties.

The method herein uses the emergent Moiré interference patterns of stacked 2DLMs as a means of manufacturing porated 2DLMs with atomically-resolved apertures. Because the spatial parameters of the Moiré interference superlattice can emerge on the angstrom-scale, far below that of traditional nano-scale manufacturing techniques, the apertures can be designed with atomic resolution. Further, because the emergent Moiré interference patterns can be deterministically designed in silico to control localized reactive areas to have arbitrarily tunable parameters, the method is highly controlled, repeatable, and generalizable.

In general, in a first aspect, the invention features a method of forming a layered material, the method including arranging a two-dimensional layered material (2DLM) on a base material including one or more Moiré interferences; and adding material or removing material at a location of the one or more Moiré interferences.

Embodiments of the method of forming a layered material can include one or more of the following features. For example, the removing can include forming a plurality of apertures, wherein each aperture can be formed at the location of the one or more Moiré interferences. The removing can include forming a plurality of apertures, wherein each aperture can be formed outside of the location of the one or more Moiré interferences. The removing can include vacuum purge, liquid purge, gas purge, plasma, vaporization, flash annealing, magnetic sweeping, lasering, or electrophoresis.

In some embodiments, the plurality of apertures can be formed in the 2DLM, the base material, or a combination thereof.

In some embodiments, the arranging can include electrochemical transfer, goniometric transfer, pick-and-place stamp transfer, contact transfer, Langmuir Blodgett deposition, atomic layer deposition (ALD), chemical vapor deposition (CVD), molecular beam epitaxy (MBE), physical vapor deposition, spin coating, spray coating, electrostatic transfer, sputter deposition, evaporative deposition, sheet/roll lamination/transfer, or combinations thereof. The arranging can include forming or disposing the 2DLM on the base material. The arranging can include misaligning the 2DLM relative to the base material.

The misaligning can include epitaxially misaligning, van der Waals misaligning, rotationally misaligning, translationally misaligning, stress misaligning, strain misaligning, angular misaligning, tilt misaligning, or combinations thereof, the 2DLM relative to the base material.

In some embodiments, the 2DLM can be a first material and the base material can be a second material. The first material and the second material are different materials. The first material and the second material are the same materials. The base material can be a 2DLM, multi-layer structure, mono-crystalline structure, or poly-crystalline structure, or combinations thereof.

The forming can include exposing the 2DLM to chemical vapor deposition, physical vapor deposition, plasma deposition, plasma etching, electrochemical etching, electrochemical deposition, molecular beam epitaxy, evaporation, exfoliation, spin coating, spray coating, pick-and-place stamp transfer, contact transfer, Langmuir Blodgett layering, atomic layer deposition (ALD), sheet/roll lamination, sheet/roll coating, evaporative deposition, or sputter deposition, or combinations thereof.

The apertures are polygonal, curvilinear, slot, circular, oval shaped, or combinations thereof. The adding can include the adsorption, physisorption, chemisorption, intercalation, and/or bonding of material to the location of the one or more Moiré interferences. The adsorption, physisorption, chemisorption, intercalation, and/or bonding adds a plurality of features. The plurality of features are polygonal, curvilinear, slot, circular, or oval shaped, or combinations thereof.

Unless otherwise defined, all technical and scientific terms used herein have the same meaning as commonly understood by one of ordinary skill in the art to which this invention pertains. Although methods and materials similar or equivalent to those described herein can be used to practice the invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 4A through FIG. 4D are schematic diagrams of incommensurate stacking.

DETAILED DESCRIPTION

This document relates to techniques for manufacturing sub-nanoscale structures by applying ångström-scale manufacturing methods. Moiré interference patterns are known in the art to create controlled nucleation sites for seeding molecular growth islands. Moiré interference patterns are known to create spatially distinct regions for the seeding of heterogeneously grown 2DLMs as well as the functionalization of distinct regions of 2DLMs.

A 2DLM can be considered any material whose constituent molecules are bonded such that the molecules define a plane approximately one atom thick (e.g., the x-y plane in Cartesian coordinates). Generally, the atoms are bonded within each layer (intra-layer) through covalent or ionic bonds. The 2DLM can also experience weak bonding between layers (inter-layer) (e.g., the z-dimension in Cartesian coordinates) such as Van der Waals forces, hydrogen bonding, or coulombic interactions. This weak bonding can allow for 2DLM stacking while maintaining a separable, layered structure. The 2DLM can be a monocrystalline or polycrystalline structure.

The process of Moiré interference patterning can be used to create layered structures with apertures through subtractive manufacturing or additional features through additive manufacturing.

Figure 1:
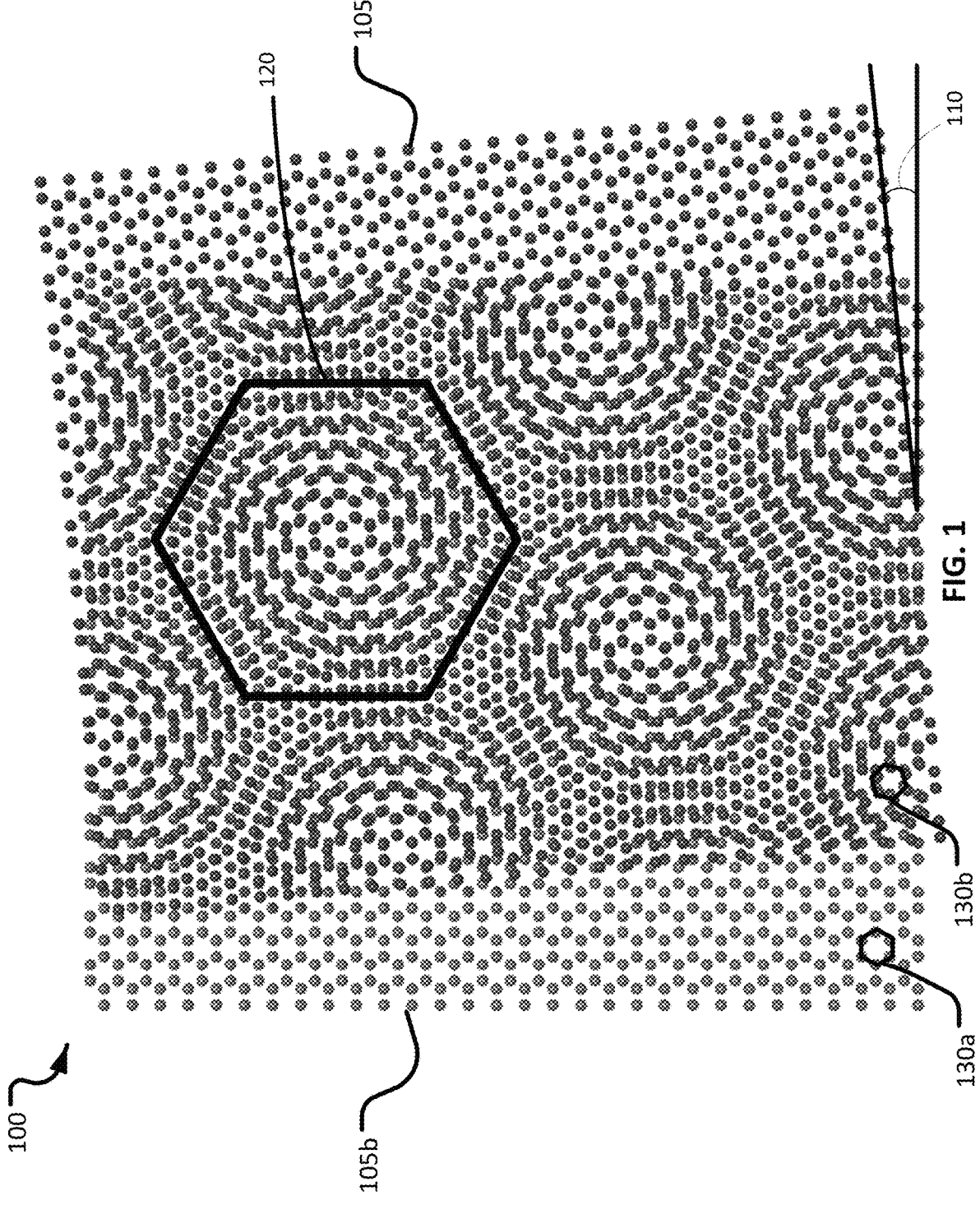
FIG. 1 shows an image depicting an example of Moiré interference.

FIG. 1 depicts two periodic structures 105 being overlaid at an incommensurate rotational angle 110 to create a rotationally incommensurate stacking interface 100 and shows an example of how a Moiré interference pattern 120 (e.g., a superlattice) may be produced. Periodic structures 105a and 105b are hexagonally-ordered layers with a unit cells 130a and 130b, respectively. In general, the unit cells 130 of the periodic structures 105 can have the same or different unit cell 130 dimensions, or configurations. For example, FIG. 1 depicts a hexagonal lattice layered on a hexagonal lattice, but periodic structure 105a or 105b may alternatively be a cubic lattice. The shape of the unit cell 130 can be any geometric shape, including but not limited to triangular, square, pentagonal, hexagonal, heptagonal, octagonal, or any composite formed from the lattice structure of the constituent 2DLMs. The unit cell 130a of the first periodic layer 105a can be of the same shape as the unit cell 130b of the second periodic layer 105b or they can be the different. The structure of an emergent Moiré pattern 120 may be dependent on the unit cells 130 of the underlying periodic structures 105 and the incommensurate angle 110 that separates their alignment.

Figures 2A, 2B:
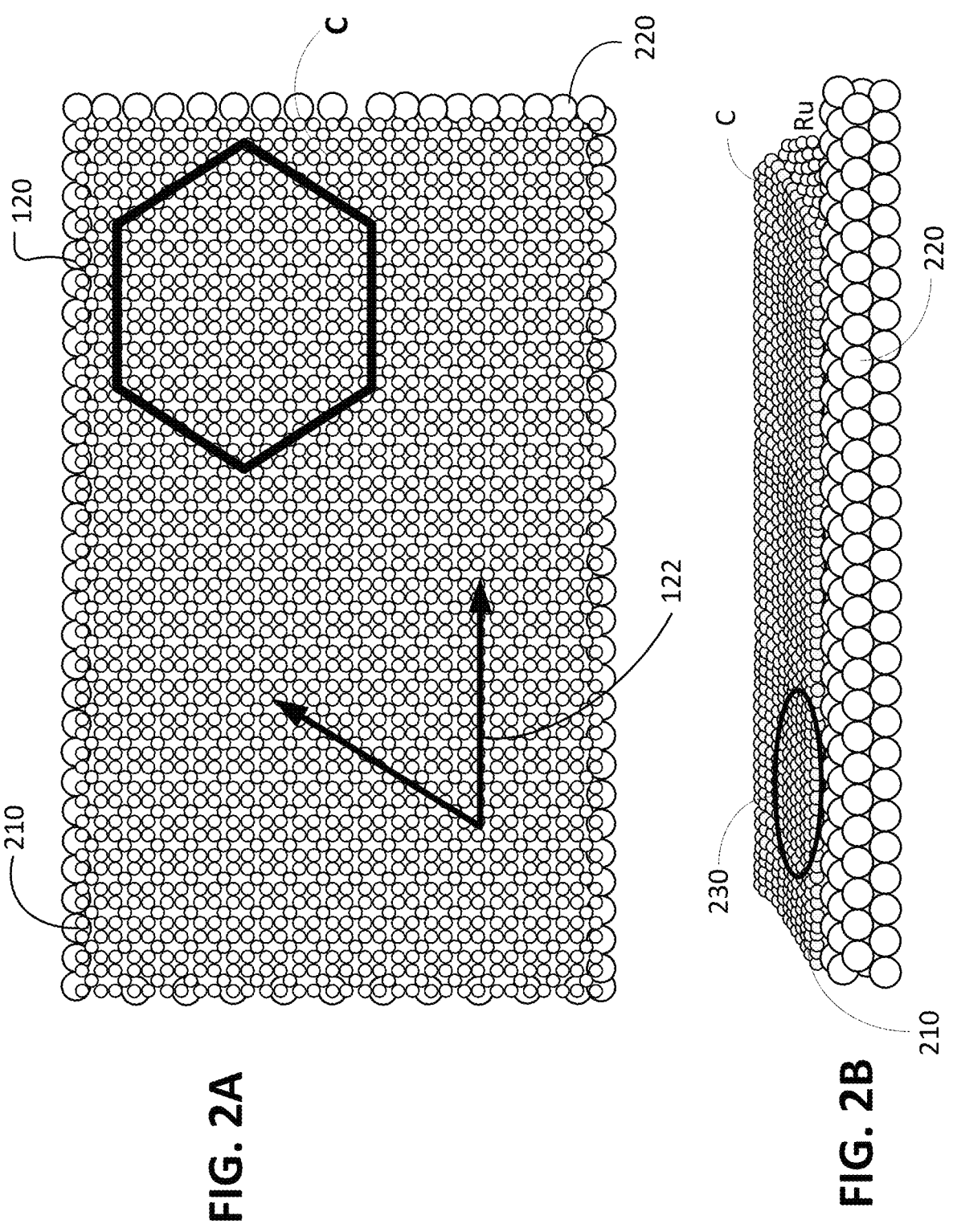
FIG. 2A and FIG. 2B shows diagrams of Moiré interference-induced selective hydrogenation of graphene on a Rubidium substrate.

FIG. 2A shows a top-down schematic view of an exemplary emergent Moiré interference pattern 120 created when a periodic structure 210 (e.g., graphene) is placed upon a base material 220 (e.g. Rubidium (Ru)). The unit cell of both graphene and crystalline Ru is hexagonal. In this example, the emergent Moiré interference pattern superlattice 120 is also hexagonally ordered. Additionally, the superlattice periodicity (e.g., beating period) is shown by arrows 122 depicting the repeating distance of the pattern 120.

Due to the electrochemical interactions of the 2DLM 210 and the base material 220, FIG. 2 depicts reactive areas 230 that are created on the graphene 2DLM 210 which are localized on the Moiré interference pattern 120. The reactive areas 230 can have different chemical reactivity than neighboring regions. In general, reactivity is the tendency of a substance to undergo chemical reaction, either by itself or with other materials, and to release or absorb energy. Reactive parameters may include, but are not limited to, temperature, reactive species, concentration, density, pressure, flux, kinetic energy, electrical potential, charge density, or potential energy. Any parameter that changes the reaction activation energy or its kinetics can be considered a reactive parameter. FIG. 2B depicts a side-on schematic view of FIG.

2A. FIG. 2B depicts the graphene 2DLM 210 disposed on top of the Ru base material 220.

Alternatively, reactive areas 230 can be exposed to a reactive gas, e.g., elemental hydrogen. The reactive gas can adsorb, chemisorb, or covalently bond to the reactive regions 230 based on the emergent Moiré interference pattern 120 between a 2DLM 210 placed upon base material 220. Areas outside the reactive regions 230 can remain un-adsorbed when exposed to the gas.

Figure 3:
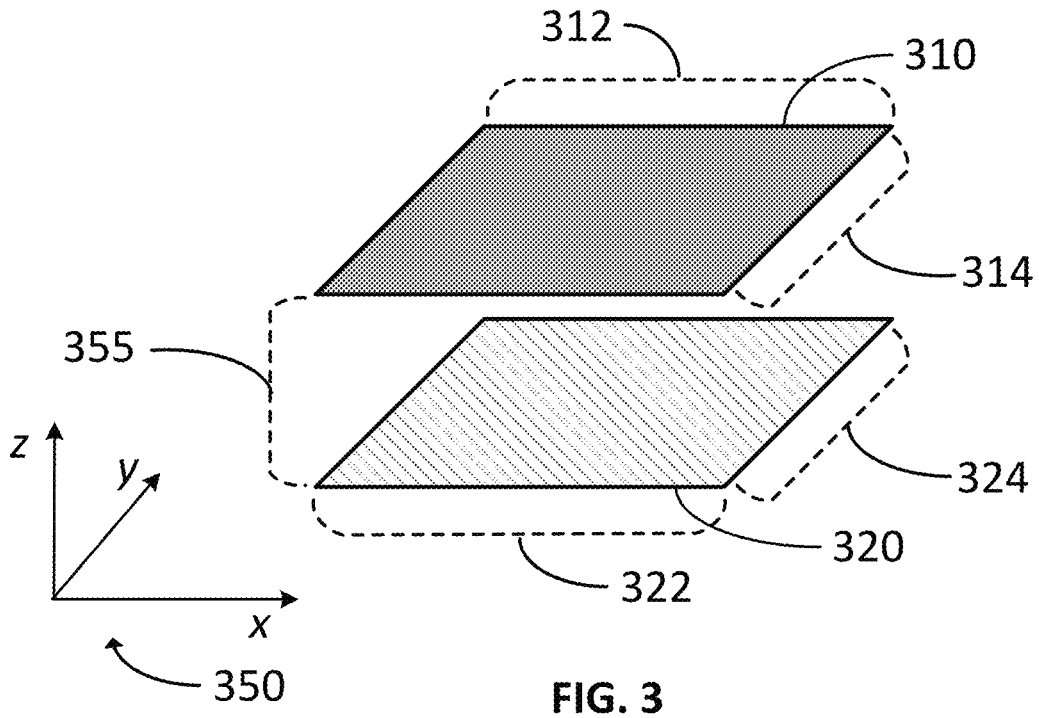
FIG. 3 shows a schematic diagram of layer stacking.

FIG. 3 is a schematic diagram depicting the relative positioning of a 2DLM 310 above a base material 320 before the process of arranging to create an incommensurate stacking interface 100 begins. In general, the orientation can be according to any reference system. FIG. 3 includes an example inset Cartesian reference axes 350 to define the orientation of the reference directions. It is to be understood that the major planar axes of the 2DLM 310 and the base material 320 are along the x-axis and y-axis. In some embodiments, the 2DLM 310 may consist of a planar sheet of monoelemental (e.g., carbon) or stoichiometric (e.g., hexagonal boron nitride) composition. In some embodiments, the base material 320 may be a second 2DLM consisting of a planar sheet of homogenous or heterogeneous materials.

Examples of methods of arranging can include electrochemical transfer, goniometric transfer, pick-and-place stamp transfer, contact transfer, Langmuir Blodgett deposition, atomic layer deposition (ALD), chemical vapor deposition (CVD), molecular beam epitaxy (MBE), physical vapor deposition, spin coating, spray coating, electrostatic transfer, sputter deposition, evaporative deposition, sheet/roll lamination/transfer, or combinations thereof. In some embodiments, the arranging can include forming or disposing a 2DLM on the base material.

In some embodiments, the base material 320 may be a 3D substrate consisting of homogenous, such as a mono-crystalline structure, or heterogeneous materials, such as a poly-crystalline structure, multi-layer material, or combination thereof. In general, the lattice structure of the 2DLM 310 can be any intrinsic lattice structure of atomically-thin materials and their polymorphs (e.g., any of the seven crystal family groups). The lattice structure of the 2DLM 310 may be, but is not limited to, hexagonal, tetragonal, pentagonal, heptagonal, or octagonal. The lattice structure of the base material 320 may be, but is not limited to, hexagonal, tetragonal, pentagonal, heptagonal, or octagonal. The lattice structure of the 2DLM 310 may be identical to, substantially similar, or substantially different from that of the base material 320.

The 2DLM 310 can be understood to have a length 312 in the x-direction and a width 314 in the y-direction. Further, the base material 320 can be understood to have a length 322 in the x-direction and a width 324 in the y-direction. In general, the length 322 and width 324 can be at least the dimensions of a lattice unit cell of the 2DLM 310 or base material 320.

Non-limiting examples of the lengths and widths the 2DLM 310 and base material 320 can include about 1 nm to about 10 μm (e.g., about 1 nm to about 10 μm, about 10 nm to about 10 μm, about 100 nm to about 10 μm, about 1 μm to about 10 μm, about 1 nm to about 1 μm, about 1 nm to about 100 nm, or about 1 nm to about 10 nm). In some embodiments, the length 312 and width 314 of the base material 320 can be different from the length 322 and width 324 of the base material 320. In some embodiments, the length 312 and width 314 of the base material 320 can be the same as the length 322 and width 324 of the base material 320. It is further to be understood that the distance 355 that separates the 2DLM 310 and the base material 320 can be normal to the surface of both the 2DLM 310 and base material 320 and along the z-axis. In some embodiments, the interlayer distance 355 can be non-constant across the dimensions of the 2DLM 310 or base material 320.

FIG. 4A depicts the arrangement of the 2DLM 310 above the base material 320 such that the planes defined by the 2DLM 310 and the base material 320 can be parallel in the x- and y-directions. A translation along the z-axis can reduce the distance 355 separating the 2DLM 310 and the base material 320 to a minimum such that the layers may be considered 'stacked', thereby creating a stacking interface 102. In some embodiments, there may be no change in radial or translational orientation, or relative dilation or contraction (due to stress or thermal effects) from the initial relative positioning. In some embodiments, this can be a type of lattice stacking (e.g., AA stacking, AA' stacking, AB stacking, or AB' stacking). In general, the 2DLM 310 and the base material 320 may thermally relax to local stacking minima defined by the crystalline parameters of the layers. The 2DLM 310 can then undergo misalignment to form an incommensurate stacking interface 100 (e.g., misaligning).

FIG. 4B depicts a type of incommensurate stacking interface constituting a rotational misalignment 410 of the 2DLM 310 and the base material 320. In some embodiments, the rotational misalignment 410 may be a radial misalignment (e.g., rotation around the z-axis). In some embodiments, the rotational misalignment 410 may be, but is not limited to, between 0° and 360° (between 0° and 360°, between 60° and 360°, between 120° and 360°, between 180° and 360°, between 240° and 360°, between 300° and 360°, between 0° and 300°, between 0° and 240°, between 0° and 180°, between 0° and 120°, or between 0° and 60°). In some embodiments, the axis of the rotational misalignment 410 may be normal to the center of the surface of the 2DLM 310. In some embodiments, the axis of the rotational misalignment 410 may be normal to a point on the surface of the 2DLM 310 that is not in the center of the surface (e.g., a corner, along an edge, at a specified point within the surface.) misalignment 510 may be normal to a point on the surface of the 2DLM 310 that is not in the center of the surface (e.g., a corner, along an edge, at a specified point within the surface).

In some embodiments, the rotational misalignment 410 may be non-uniform. For example, one edge of the 2DLM 310 can be held fixed while the opposite edge undergoes a rotation around an axis to produce a "twist" misalignment. In general, the axis of rotation can be along a planar axis of the 2DLM, a combination of the planar axes, normal to the surface of the 2DLM, or at any angle in between. For example, a rotation around an axis normal to the surface of the 2DLM 310 can produce a "bending" misalignment. This type of misalignment can induce linear incommensurate superlattice domains ("strain solitons"). The rotational axis can be oriented at an angle between a range of 0° (e.g., aligned with the plane of the 2DLM layer 310) and 90° (e.g., normal to the surface of the 2DLM 310).

FIG. 4C depicts a type of incommensurate stacking interface constituting a translational misalignment 420 of the 2DLM 310 and the base material 320. In some embodiments, the translational misalignment 420 may be in one or more longitudinal directions (e.g., x-axis, y-axis, or both). In some embodiments, the translational misalignment may be along one or more crystalline lattice directions. In some embodiments, the translational misalignment 420 in one or more directions may be, but is not limited to, integer values of the lattice parameters of the 2DLM 310. In some embodiments, the translational misalignment 420 in one or more directions may be, but is not limited to, non-integer values of the lattice parameters of the 2DLM 310 (e.g., fractional values).

FIG. 4D depicts a type of incommensurate stacking interface 100 constituting a strain misalignment 430 (also commonly referred to as "strain mismatch") of the 2DLM 310 and the base material 320 due to applied mechanical stress. In some embodiments, the strain misalignment 430 may be in a longitudinal direction (e.g., x-axis, or y-axis). In some embodiments, the strain misalignment 430 may be in a combination of both longitudinal directions (e.g., x-axis and y-axis). Means to apply the strain can include, but are not limited to, mechanically, photo-induced, thermally, magnetically, or chemically-induced strain.

In general, incommensurate stacking interfaces can be made from one or more types of misalignment, including but not limited to one or more epitaxially misalignment, van der Waals misalignment, rotational misalignment 410, translational misalignment 420, strain misalignment 430, angular misalignment, tilt misalignment, or a combination thereof.

Figures 5A, 5B:
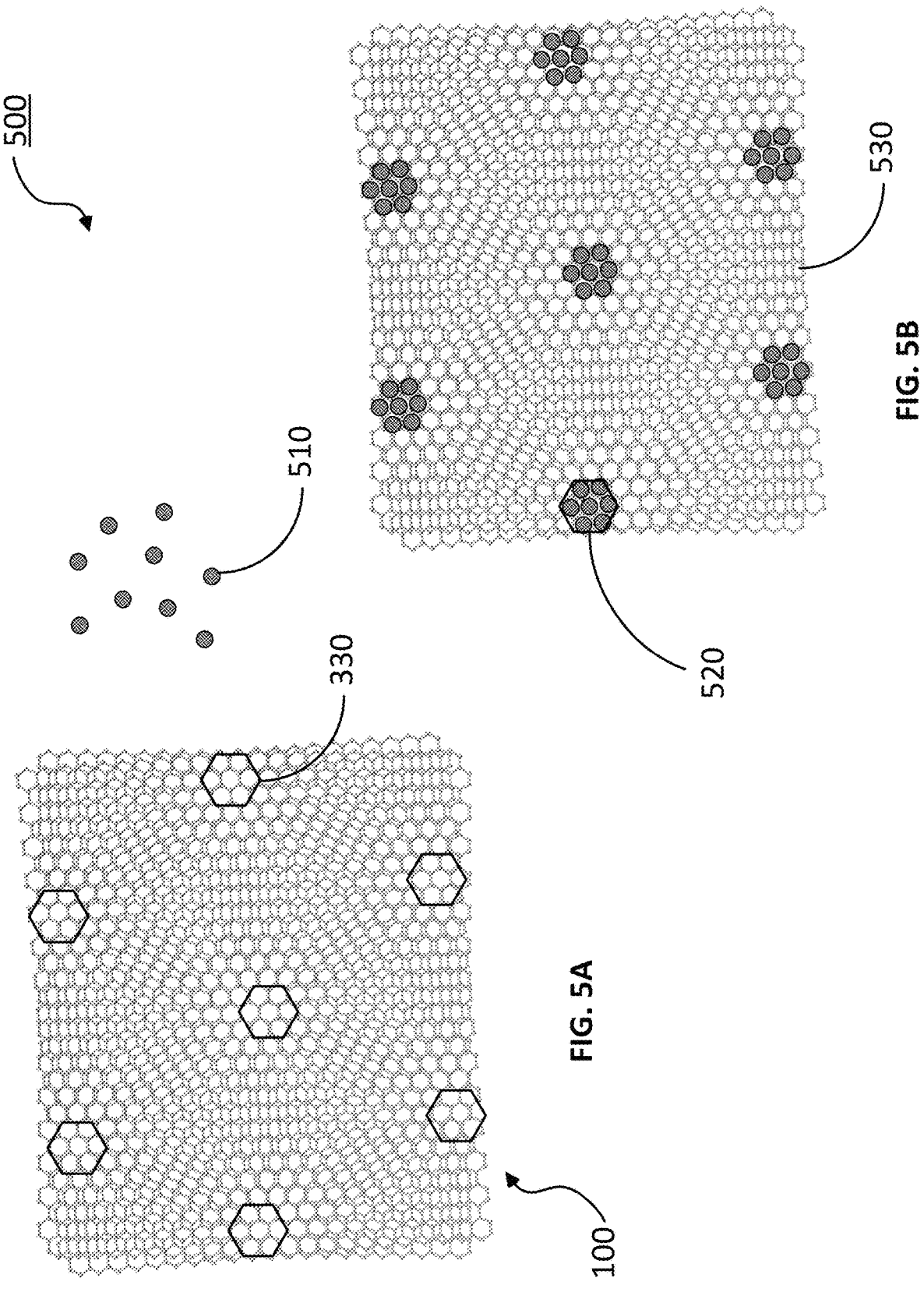
FIG. 5A and FIG. 5B are schematic diagrams of functionalization of a Moiré interference pattern.

FIGS. 5A and 5B depict the process of patterning 500 to create a layered material. In general, the process of patterning can include additive or subtractive patterning. FIG. 5A depicts the first step in patterning 500 an incommensurate stacking interface 100 of two 2DLMs. An incommensurate stacking interface 100 is shown depicting an example rotational misalignment of a two hexagonally ordered 2DLMs. The stacking of the layers then creates reactive regions 330 from the Moiré interference superlattice. These distinct reactive regions 330 on a Moiré interference superlattice can be differentiated by one or more chemical properties, such as stacking properties, surface energies, interlayer energies, coordination numbers, etc.

The exemplary reactive regions 330 in FIG. 5A are depicted as hexagonal regions centered on the AA stacking domains of the incommensurate stacking interface 100. In general, the reactive regions 330 can be any closed (e.g., bounded) or open (e.g., unbounded) region defined by the Moiré interference superlattice parameters that covers at least a portion of the surface of the incommensurate stacking interface 100. In some embodiments, the reactive regions 330 can cover a confined region on the incommensurate stacking interface 100 (e.g., a closed shape). For example, the region defined by the Moiré interference (e.g., the hexagonal region of FIG. 5A) may be the same as the reactive regions 330, thereby distinct closed regions that are not interconnected. Alternatively, the reactive region 330 may be the continuous region defined outside of the Moiré interferences, thereby forming an open region extending to edges of the incommensurate stacking interface 100 and excluded by the Moiré interferences.

As an example, closed reactive regions 330 can be functionalized through a first pathway (e.g., hydrogenation) and continuous regions (outside of reactive regions 330) can be functionalized through a second pathway (e.g., oxygenation). Alternatively, the functionalization pathway sequence can be reversed, or the functionalization pathways can happen simultaneously.

In some embodiments, the reactive region 330 can be defined by the area outside of that enclosed by the Moiré superlattice structure. In some embodiments, the reactive region 330 can be defined by the area not enclosed by the Moiré superlattice structure. In some embodiments, there may be one or more reactive regions 330 on an incommensurate stacking interface 100 (e.g. two or more, three or more, four or more, five or more). In some embodiments, there may be reactive regions 330 of the same shape. In some embodiments, there may be reactive regions 330 of different shapes. In some embodiments, the reactive regions 330 may be a combination of one or more shapes.

FIG. 5A further depicts that the reactive regions 330 can then be reacted with a functionalizing material 510. A functionalizing material 510 may further change the reactivity of the reactive regions 330 relative to neighboring regions by chemically associating with the reactive regions 330 and lowering the chemical potential for future chemical reactions (e.g., adsorption, chemisorption, physisorption, columbic interaction, covalent/ionic bonding, or intercalation).

FIG. 5B shows the incommensurate stacking interface 100 after being exposed to the functionalizing material 510. In some embodiments, the functionalizing material 510 can selectively chemisorb to the reactive regions 330 to create functionalized regions 520 on a functionalized stacking interface 530. The functionalizing material 510 may be a single species or a combination of two or more materials that may either react with the 2DLM surface individually or constitute a first reaction amongst themselves and subsequently with the 2DLM surface. Functionalized regions 520 may further increase the level of reactivity relative to neighboring regions. In some embodiments, the functionalized regions 520 may have the same shape or size as the reactive regions 330 as described herein.

In some implementations, the functionalized regions 520 can include adding a plurality of features along the surface of the 2DLM by using selective molecular additive manufacturing. In some implementations, the plurality of features are polygonal, curvilinear, slot, circular, or oval shaped, or combinations thereof. In some implementations, the functionalized regions 520 may act as a site for further functionalization, as discussed with FIGS. 5C and 5D.

Figures 5C, 5D:
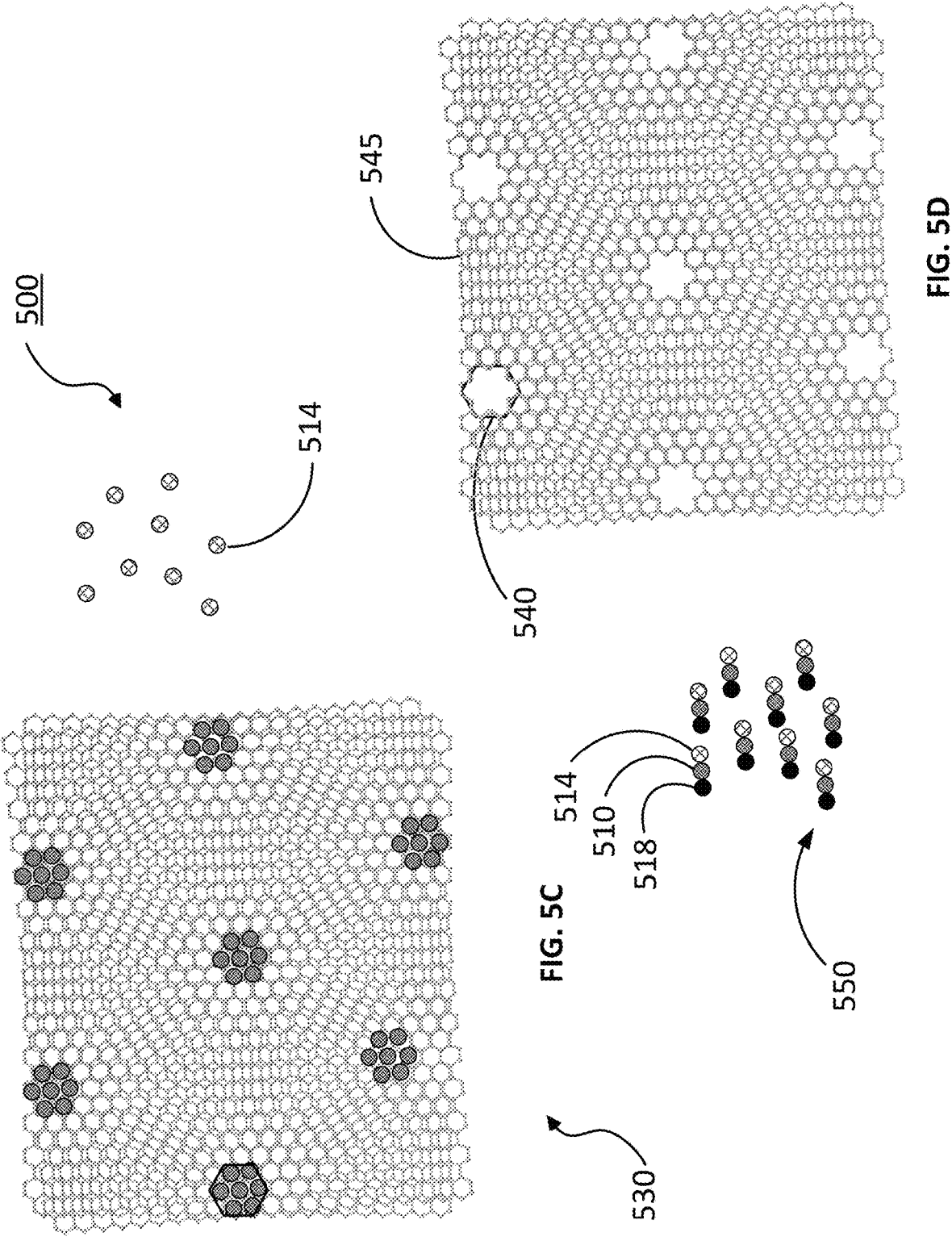
FIG. 5C and FIG. 5D are schematic diagrams of subtractive patterning after functionalization of a Moiré interference pattern due to rotational incommensurate 2DLM stacking.

FIG. 5C shows the functionalized stacking interface 530 being exposed to a reactive material 514 in a further step in the process of patterning 500. The functionalized stacking interface 530 may be exposed to the reactive material 514 under any single or combination of conditions described herein. The reactive material 514 can be any material as described herein. It is to be understood that the reactive material 514 may be chosen based upon interaction characteristics with the functionalizing material 510.

In some embodiments, the incommensurate stacking interface 100 may be exposed to the reactive 514 or functionalizing material 510 at a pressure between 0 and 1000 psig (e.g., between 0 and 1000 psig, between 200 and 1000 psig, between 400 and 1000 psig, between 600 and 1000 psig, between 800 and 1000 psig, between 0 and 800 psig, between 0 and 600 psig, between 0 and 400 psig, or between 0 and 200 psig). The pressure at which the incommensurate stacking interface 100 is exposed to reactive 514 or functionalizing material 510 can affect the reaction kinetics (e.g. kinetic energy, mean free path, reaction rate, etc.) In some embodiments, the incommensurate stacking interface 100 may be exposed to the reactive 514 or functionalizing material 510 at a temperature between 30° C. and 3000° C. (e.g., between 30° C. and 3000° C., between 300° C. and 3000° C., between 500° C. and 3000° C., between 1000° C. and 3000° C., between 1500° C. and 3000° C., between 2000° C. and 3000° C., between 2500° C. and 3000° C., between 30° C. and 2500° C., between 30° C. and 2000° C., between 30° C. and 1500° C., between 30° C. and 1000° C., between 30° C. and 500° C., or between 30° C. and 300° C.).

In some embodiments, the incommensurate stacking interface 100 may be exposed to the reactive 514 or functionalizing material 510 in a solvent (e.g., water, ethanol, methanol).

In general, the reactive 514 or functionalizing material 510 may be a liquid, plasma, gas, or combination thereof. In some embodiments, the reactive 514 or functionalizing material 510 may be an elemental (e.g., neutral hydrogen) or molecular (e.g., fluoride) gas. In some embodiments, the reactive 514 or functionalizing material 510 may be a heterogeneous mixture of elemental (e.g., hydrogen, oxygen, nitrogen, argon, helium, or chlorine) and molecular gases (e.g., hydrides, oxides, nitrides, fluorides, sulfides, chlorides, selenides, tellurides, arsenides, or silicides). In some embodiments, the reactive 514 or functionalizing material 510 may be completely, or partially ionized.

It is to be understood that the reactive 514 or functionalizing material 510 may be chosen based on interaction characteristics with the 2DLM 310 of the incommensurate stacking interface 100.

FIG. 5D depicts a further step in the process of patterning 500 through the creation of apertures 540. The reactive material 514 may react with the functionalizing material 510 within the functionalized regions 520 of the functionalized stacking interface 530. Without being bound by theory, it is believed that the reaction between the reactive material 514 and the functionalizing material 510 can create a chemical bond between the reactive material and the functionalizing material 510 which can further disrupt the localized chemical bonds between the 2DLM 310 and the base material 320 neighboring the functionalized regions 520. The disruption may then allow the chemically bonded reactive material 514, functionalizing material 510, and substituent molecule 518 of the incommensurate stacking interface 100 and can create desorbed molecules 550.

The removal of the desorbed molecules 550 from functionalized regions 520 may leave one or more apertures 540 within the incommensurate stacking interface 530. The removal of many desorbed molecules 550 may leave apertures 540 of the same shape as the functionalized regions 520. The removal of the desorbed molecules 550 can be accomplished through vacuum, a liquid or gas purge, plasma, vaporization, or alternative ablative process (e.g., flash annealing, lasering, or electrophoresis).

In some embodiments, the functionalizing material 510 may not react with the reactive material 514. In this manner, the functionalizing material 510 may shield the reactive regions 330 of the stacking interface 530 from reaction with the reactive material 514 and act as a mask for further reactions. The reactive material 514 may then react with the 2DLM of the interface 530 rather than the reactive regions 330.

After the removal of the desorbed molecules 550, a porated stacking interface 545 with one or more apertures 540 is left. In some embodiments, the apertures 540 may be in the 2DLM 310 and not the base material 320. In some embodiments, the apertures 540 may be in both the 2DLM 310 and the base material 320. In some embodiments, the porated stacking interface 545 may have one or more apertures 540 (e.g. two or more, three or more, four or more, five or more). The apertures 540 may be of any shape or combination of shapes listed herein. In some embodiments, there may be one or more apertures 540 on the porated stacking interface 545 (e.g. two or more, three or more, four or more, five or more). For example, the apertures can be polygonal, or curvilinear, slot, circular, or oval shaped, or combinations thereof.

The porated stacking interface 545 may they be separated through any method known in the art. Non-limiting examples of separation methods can include, but are not limited to, mechanical cleavage, fluid exfoliation, or atomic layer etching. In some embodiments, the porated stacking interface 545 can be left as a stacked interface and not separated.

Figures 6A, 6B:
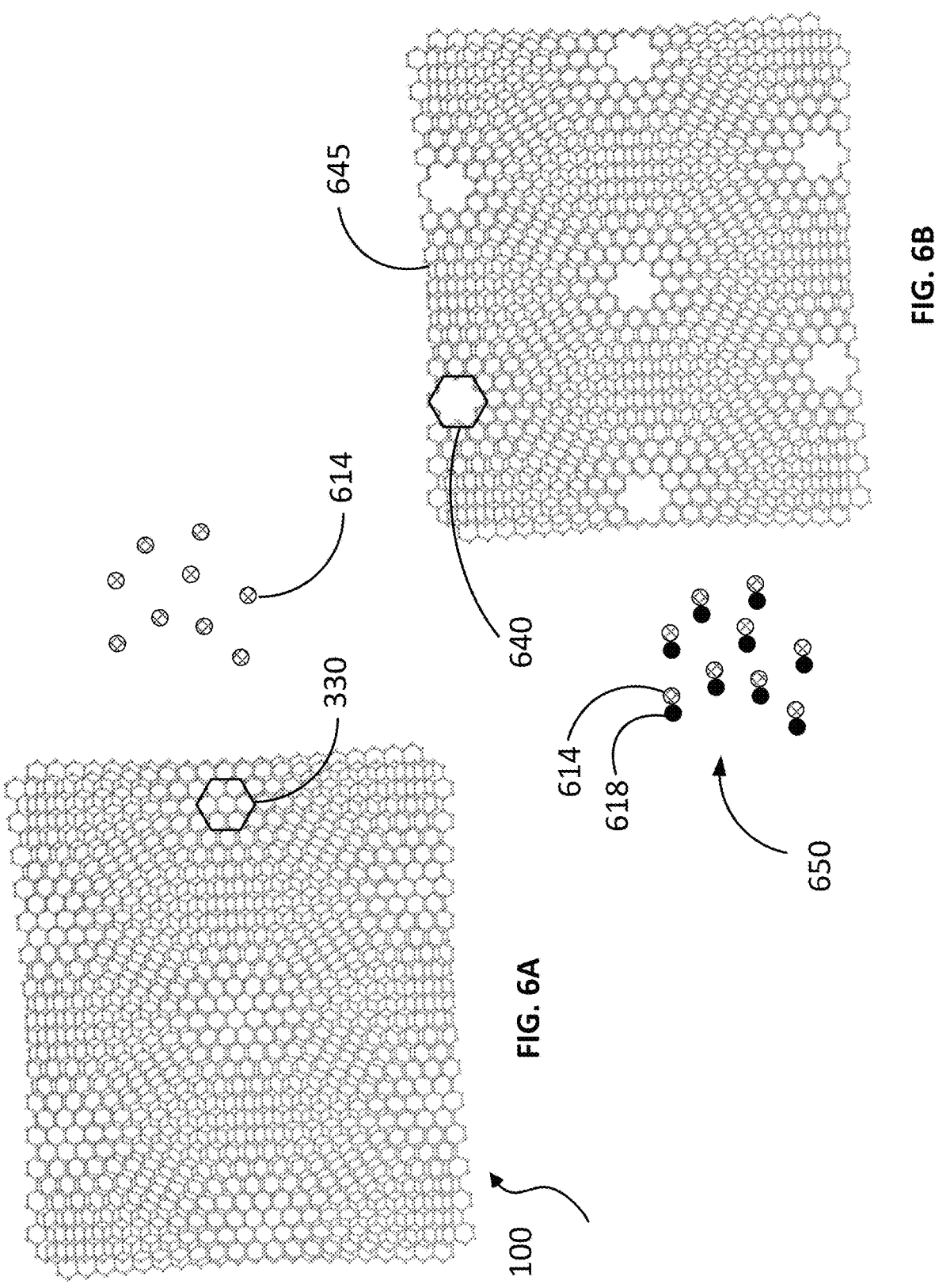
FIG. 6A and FIG. 6B are schematic diagrams of subtractive patterning of a Moiré interference pattern due to rotational incommensurate 2DLM stacking without functionalization.

In some embodiments, the reactive regions may be exposed to a reactive material without prior functionalization. FIG. 6A shows an incommensurate stacking interface 100 being exposed to a reactive material 614. The reactive material 614 may react with the reactive regions 330 to remove substituent molecules 618 from an incommensurate stacking interface 100 to form desorbed molecules 650. The removal of the desorbed molecules 650 from the reactive regions 330 may leave an aperture 640 and form the porated stacking interface 645. The removal of many desorbed molecules 650 may leave apertures 640 of the same shape as the reactive regions 620.

FIG. 6B depicts a porated stacking interface 645 with one or more apertures 640 after the removal of the desorbed molecules 650. In some embodiments, the apertures 640 may be only in the 2DLM 310 and not the base material 320. In some embodiments, the apertures 640 may be in both the 2DLM 310 and the base material. In some embodiments, the porated stacking interface 645 may have one or more apertures 640 (e.g. two or more, three or more, four or more, five or more). The apertures 640 may be of any shape or combination of shapes listed herein.

Figure 7:
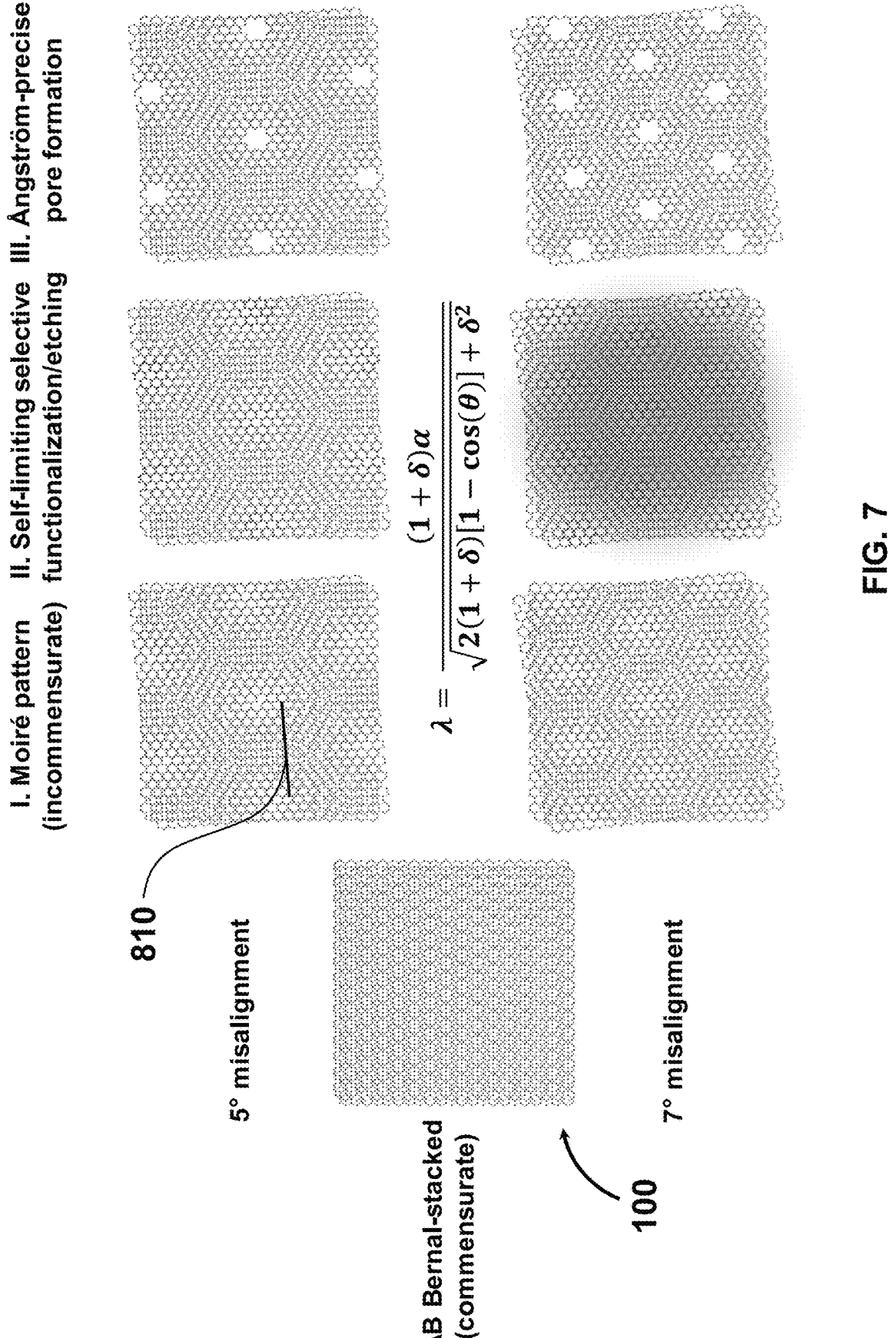
FIG. 7 is a series of images depicting the process by which a Moiré interference pattern may be designed.

FIG. 7 shows an exemplary diagram of designing a Moiré interference pattern through incommensurate rotations of two AB stacked 2DLMs 310 forming an incommensurate stacking interface 100. The emergent Moiré interference pattern forms a superlattice, a hierarchical structure determined from the intrinsic lattice(s) and degree of misalignment of the incommensurate stacking interface 100.

Without wishing to be bound by theory, the superlattice spatial beating period 810 is defined as $$\lambda = \frac{((1+\delta)*a)}{\sqrt{(1+\delta)[1-\cos\theta]+\delta^2}}$$

where $\delta$ is the lattice mismatch between the 2DLMs, $\alpha$ is the lattice constant of the base material (e.g., 2.46 Å for graphene), and $\theta$ is the rotational difference between the layers.

The lattice mismatch is defined as $$\delta = \frac{b-a}{b}*100$$

where the lattice constant of the upper 2DLM of the substrate is b.

Figure 8:
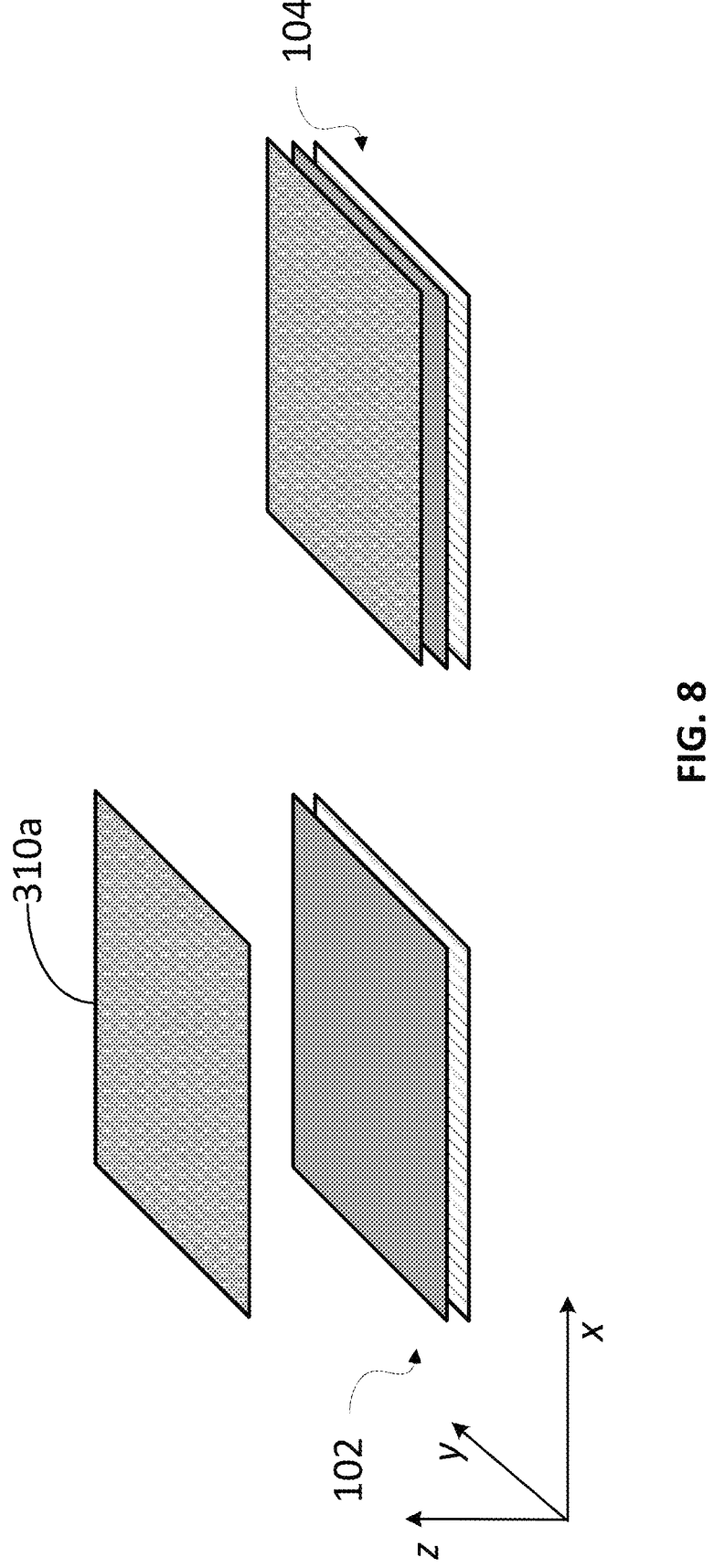
FIG. 8 shows schematic diagrams demonstrating multiple layer stacking on a base layer.
Figure 9:
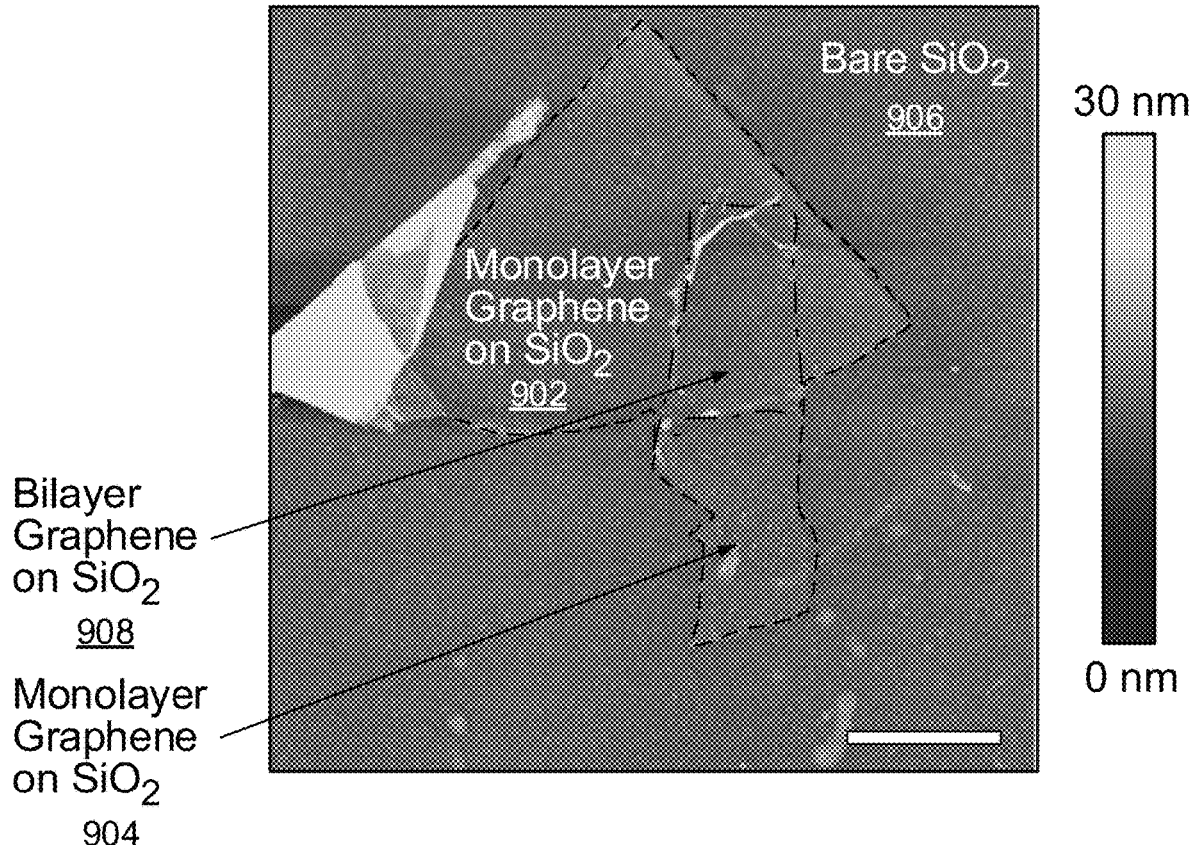
FIG. 9 shows an atomic force microscopy image of graphene monolayers forming a stacked bilayer.

While above examples have depicted stacking interfaces using two layers, e.g., a 2DLM and a base material, in general stacking interfaces may be constructed of more than two layers. For example, FIG. 8 depicts a process by which further 2DLMs 310a may be stacked upon a stacked interface 102 assembled from at least one 2DLM (e.g., two layers, three layers) 310 disposed upon a base material 320. After arranging a first 2DLM 310 upon a base material 320 to form a stacked interface 102, further layers may be disposed above the first 2DLM 310 if desired. FIG. 8 depicts the relative positioning of a second 2DLM 310a above a stacked interface 102 before the process of arranging begins. FIG. 9 depicts a stacked interface 102 but in general, a second or more 2DLM 310 can be disposed upon incommensurate stacked interface 100 as well.

It is to be understood that the major planar axes of the second 2DLM 310 and the stacked interface 102 are along the x-axis and y-axis. In general, the second or more 2DLM 310 can be any material, size, or lattice structure described herein.

The second 2DLM 310 may be disposed above the stacked interface 102 such that the planes defined by the second 2DLM 310 and the stacked interface 102 are parallel in the x- and y-directions. A translation along the z-axis will bring the second 2DLM 310 and the stacked interface 102 in proximity such that the layers may be considered 'stacked' and form a multiply stacked interface 104. In some embodiments, there may be no change in rotational, translational, or stress/strain state from the initial relative positioning of the second 2DLM 310 and the stacked interface 102. In some embodiments, this may be a type of high-symmetry lattice stacking (e.g., AA stacking, AA' stacking, AB stacking, or AB' stacking).

The arranging of the second or more 2DLM 310a upon the stacked interface 102 can produce a multiply stacked interface 104 that may consist of a rotational 510, translational 520, or stress/strain 530 misalignment of the second or more 2DLM 310 and the stacked interface 102 in any range described herein.

Once the second or more 2DLM 310 has been disposed upon the stacked interface 102 to form a multiply stacked interface 104, the process of patterning 600 can be performed on the second or more 2DLM 310. In some embodiments, the process of patterning 600 may be performed on the second 2DLM 310 without a prior process of functionalization as shown in FIG. 6.

In general, the process depicted in FIG. 8 can be repeated with the relative positioning of a third or more 2DLMs 310 above the multiply stacked interface 104 and arranging the third or more 2DLMs 310 onto the multiply stacked interface 104.

Once the third or more 2DLMs 310 has been disposed upon the multiply stacked interface 104, the process of patterning 600 can be performed on the third or more 2DLM 310. In some embodiments, the process of patterning 600 may be performed on the third or more 2DLM 310 without a prior process of functionalization as shown in FIG. 7.

The invention will be further described in the following examples, which do not limit the scope of the invention described in the claims.

EXAMPLES

The following examples describe the arranging of graphene monolayers to form stacked 2DLMs on silicon dioxide (SiO$_2$) base material. These examples are only for illustrative purposes and are not meant to limit the scope of the present disclosure. In each of the examples below, all reagents and solvents were purchased and used without further purification unless specified.

Example 1: First Example of Stacked Graphene Monolayers on Silicon Dioxide

FIG. 9 is an atomic force microscope (AFM) image of two graphene monolayers 902 and 904 on a SiO2 base material 906 forming a stacked bilayer 908 (2DLM) of graphene. The image was collected using a silicon AFM tip. The graphene monolayers 902 and 904 were produced by micromechanical exfoliation of thick graphite and sequentially stacked via stamp transfer onto the SiO2 base material 906.

A PDMS (polydimethylsiloxane) stamp was heated to 150° C. and pressed to the exfoliated first graphene monolayer 902 for five minutes to adhere the monolayer 902 to the stamp. The PDMS stamp was transferred to the SiO2 base material, heated to 210° C., and left in contact with the base material for 10 minutes to release the first graphene monolayer 902. The process was repeated for the second graphene monolayer 904 to form the stacked bilayer 908.

The graphene monolayer regions 902 and 904 are outlined in white dashed lines, and the stacked bilayer 908 region is outlined in black dotted lines. A scale bar is included in the bottom right of the AFM image depicting a scale distance of 10 μm. To the right of FIG. 9 is a shading scale bar depicting the shade corresponding to the total height of the SiO2 base material 906 and two graphene monolayers 902 and 904 at a spatial location in the image. The lowest height (0 nm) corresponds with dark grey shadings, while the highest height of the scale (30 nm) corresponds with light grey shadings.

As a result of the rotational and translationally mismatched stacking of the top graphene monolayer 902 and bottom graphene monolayer 904, Moiré interferences (not visible) are formed within the stacked bilayer 908 region.

Example 2: Second Example of Stacked Graphene Monolayers on Silicon Dioxide

Figure 10:
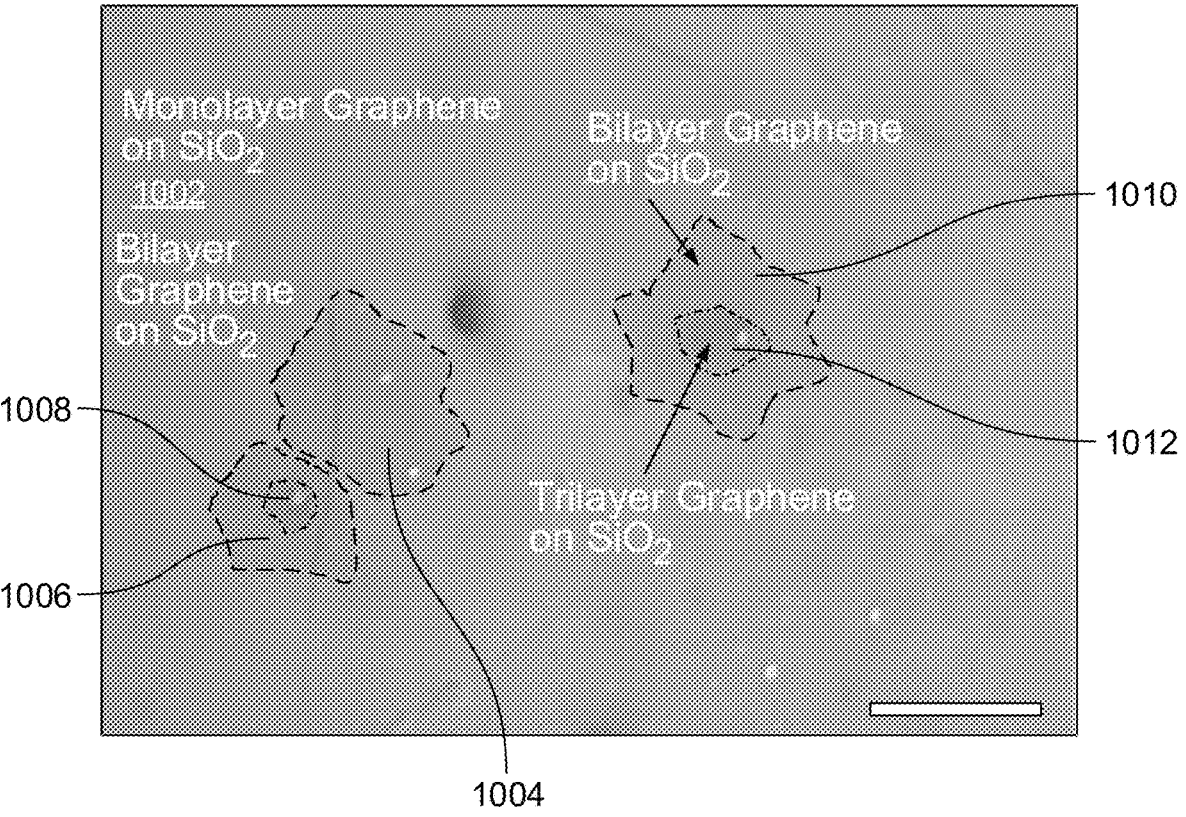
FIG. 10 shows a bright field microscopy image of multiple graphene monolayers forming stacked bilayers and stacked trilayers.

FIG. 10 is a bright field optical image of six graphene monolayers 1002, 1004, 1006, 1008, 1010, and 1012 on a SiO2 base material forming three bilayer regions (2DLM) of graphene, and two trilayer regions of graphene. The graphene monolayers 1002, 1004, 1006, 1008, 1010, and 1012 were synthesized by chemical vapor deposition from a carbon-containing precursor (e.g. methane) on a copper catalyst heated to 1050° C. in the growth chamber. The graphene monolayers 1002, 1004, 1006, 1008, 1010, and 1012 were then transferred to a SiO2 base material using a solution-based transfer method.

As graphene is synthesized on both sides of the copper catalyst, one face of the substrate to be transferred is coated with a handle layer material (e.g., polymethyl methacrylate (PMMA) or gold) using a deposition technique (e.g. spin-coater or e-beam thin film evaporator). A plasma etches the graphene on one side of the substrate and leaves the opposing coated side intact. The copper catalyst is floated on an etchant solution (e.g. dilute ammonium persulfate, sodium persulphate, ferric chloride (10 g/1000 mL)).

The copper substrate etches (e.g., dissolves) into solution within 24-48 hours, after which only the graphene and handle layer remain on the liquid surface.

The graphene monolayer with the handle layer intact is then floated onto the surface of deionized water. The handle layer is removed using an organic solvent for PMMA removal, and metal etchant is used for gold removal, respectively. The graphene monolayers are then transferred onto the SiO$_2$ base material.

The first graphene monolayer 1002 covers the SiO$_2$ base material across the extent of the bright field image area. Graphene monolayers 1004, 1006, and 1010 are stacked onto the first graphene monolayer 1002 forming the three bilayer regions, outlined in dashed white lines. Graphene monolayers 1008 and 1012 are stacked onto graphene monolayers 1006 and 1010 forming the two trilayer regions of graphene, outlined in white dotted lines. A scale bar is included in the bottom right of the FIG. 10 depicting a scale distance of 20 μm.

As a result of the rotational and translationally mismatched stacking of stacked graphene monolayers, such as graphene monolayer 1004 on graphene monolayer 100, Moiré interferences (not visible) are formed within the stacked bilayer and trilayer regions.

Figures 11A, 11B, 11C:
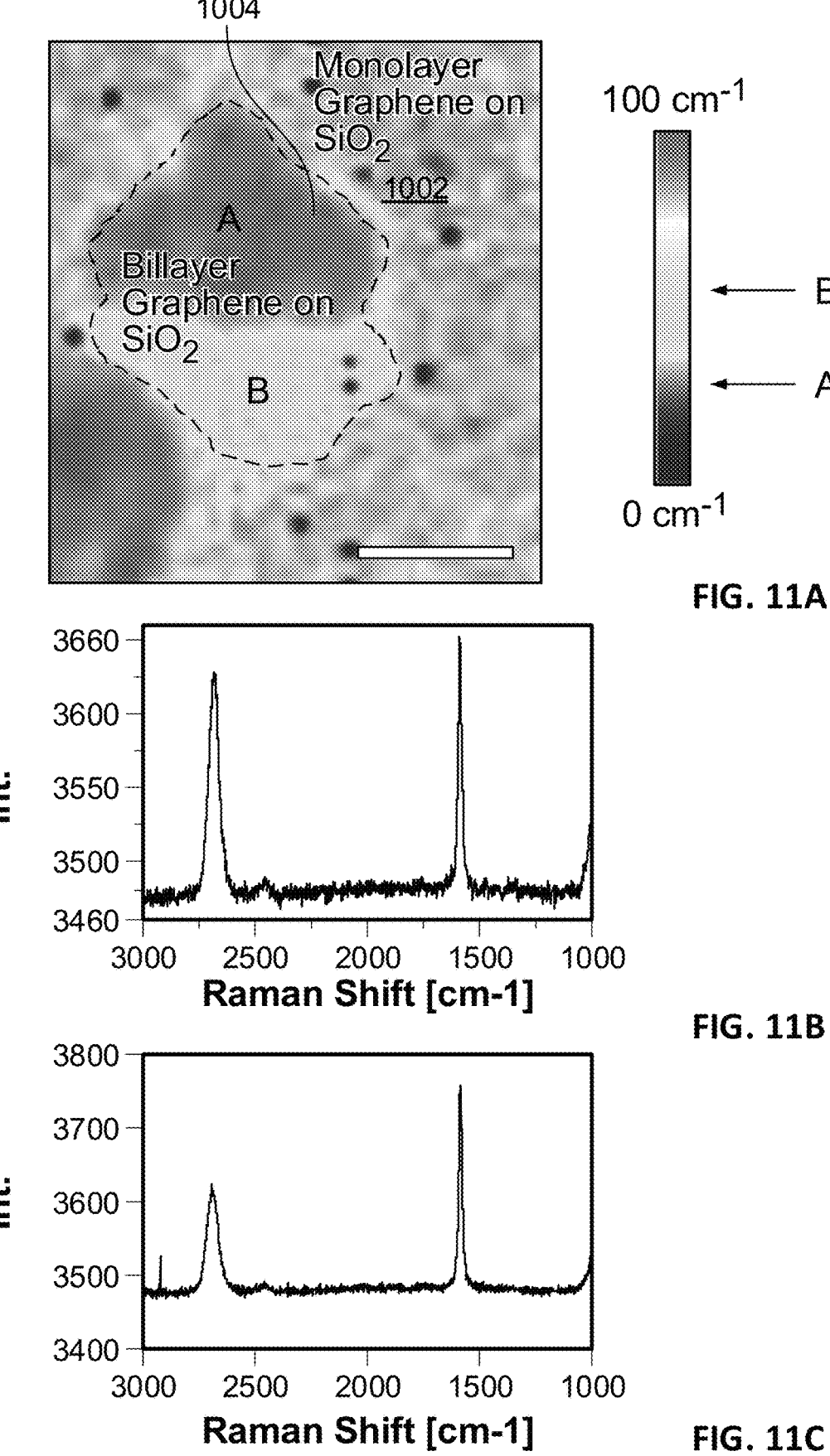
FIG. 11A shows a Raman shift map of a stacked bilayer region of FIG. 10.
FIGS. 11B and 11C show graphs of Raman spectra of two regions of the stacked bilayer of FIG. 11A.

FIG. 11A is a two-dimensional Raman spectra image of graphene monolayers 1002 and 1004 forming a bilayer region (2DLM) of graphene shown in FIG. 10. The first graphene monolayer 1002 covers the SiO$_2$ base material across the extent of the Raman spectra image area. As above, the bilayer region is outlined in a dashed line. A scale bar is included in the bottom right of FIG. 11A depicting a scale distance of 10 μm.

A color scale is included to the right of FIG. 11A correlating image shading to Raman wavenumber shift on a scale from 0 cm$^{-1}$ to 100 cm$^{-1}$. The bilayer region contains a grain boundary with two separate bilayer crystalline domains (A and B) with different rotational mismatch of the top monolayer with respect to the bottom monolayer graphene. The approximate Raman wavenumber shift of the crystalline domains A and B are shown as arrows labelled A and B, respectively.

The rotational mismatch was determined based on the Raman spectra graphs of FIGS. 11B and 11C. FIGS. 11B and 11C are Raman spectra graphs charting normalized photon intensity values (arb) against Raman shift in wavenumbers (cm$^{-1}$). FIG. 11B corresponds with crystalline domain B of FIG. 11A and FIG. 11C corresponds with crystalline domain C of FIG. 11A. A clear distinction between the two different rotationally incommensurate domains (A and B) is visible via difference in the area-averaged 2D peak full-width half-max at approximately 2700 cm$^{-1}$. As a result of the rotational and translationally mismatched stacking of the graphene layers, Moiré interferences (not visible) are formed within the stacked bilayer regions.

Figure 12:
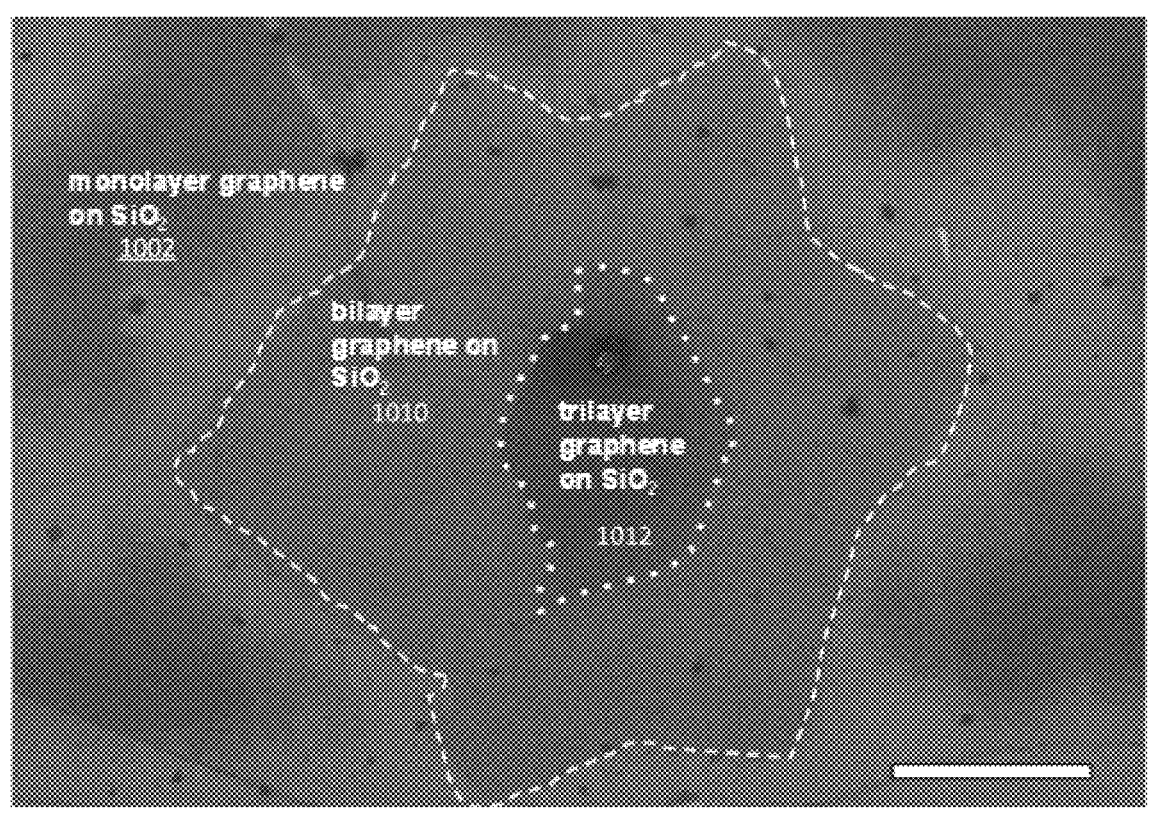
FIG. 12 shows a scanning electron microscope image of a stacked bilayer and a stacked trilayer region of FIG. 10.

FIG. 12 is a scanning electron microscope (SEM) image of graphene monolayers 1002, 1010, and 1012 forming the bilayer and trilayer regions shown in FIG. 10. SEM imaging shows increased contrast between insulating and conducting materials, facilitating the detection of graphene defects exposing the silica substrate. The first graphene monolayer 1002 covers the SiO$_2$ base material across the extent of the scanning electron microscope image area. As above, the bilayer region is outlined in a dashed line, and the trilayer region outlined in a dotted line. A scale bar is included in the bottom right of FIG. 12 depicting a scale distance of 5 μm. As a result of the rotational and translationally mismatched stacking of the graphene layers, Moiré interferences (not visible) are formed within the stacked bilayer and trilayer regions.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method of forming a layered material, the method comprising:

arranging a two-dimensional layered material ("2DLM") on a base material at an incommensurate rotational stacking interface such that the stacking interface exhibits a Moiré interference superlattice having one or more reactive regions;

exposing the one or more reactive regions to a functionalizing material such that the functionalizing material selectively chemisorbs on the reactive regions, thereby forming functionalized regions at the stacking interface that have a different reactivity than neighboring regions;

exposing the functionalized stacking interface to at least one reactive material wherein the at least one reactive material reacts with the functionalizing material within the functionalized regions to create a chemical bond between the at least one reactive material and the functionalizing material configured to disrupt localized chemical bonds between the 2DLM and the base material neighboring the functionalized regions and create at least one desorbed molecule;

selectively removing the at least one desorbed molecule from the functionalized regions to form a plurality of apertures, wherein removal of the at least one desorbed molecule leaves apertures of the same shape as the functionalized regions;

wherein the plurality of apertures are in the 2DLM and not the base material;

wherein the at least one reactive material is selected from a group comprising an elemental gas, a molecular gas, a plasma, and a combination thereof; and wherein the at least one reactive material is partially ionized.

2. The method of claim 1, wherein the removing includes vacuum purge.

3. The method of claim 1, wherein the arranging includes chemical vapor deposition (CVD).

4. The method of claim 1, wherein the arranging includes forming or disposing the 2DLM on the base material.

5. The method of claim 1, wherein the arranging includes misaligning the 2DLM relative to the base material.

6. The method of claim 5, wherein the misaligning includes epitaxially misaligning, van der Waals misaligning, rotationally misaligning, translationally misaligning, stress misaligning, strain misaligning, angular misaligning, tilt misaligning, or combinations thereof, the 2DLM relative to the base material.

7. The method of claim 1, wherein the 2DLM includes a first material and the base material includes a second material.

8. The method of claim 7, wherein the first material and the second material are different materials.

9. The method of claim 1, wherein the base material is a 2DLM, multi-layer structure, mono-crystalline structure, or poly-crystalline structure, or combinations thereof.

10. The method of claim 1, wherein the apertures are polygonal, curvilinear, slot, circular, oval shaped, or combinations thereof.

* * * * *